US011083263B2

(12) United States Patent
Reyes

(10) Patent No.: US 11,083,263 B2
(45) Date of Patent: Aug. 10, 2021

(54) CELLULAR DEVICE CASE HAVING A BUILT-IN MOUNT

(71) Applicant: Guadalupe Reyes, Kirkland, WA (US)

(72) Inventor: Guadalupe Reyes, Kirkland, WA (US)

(*) Notice: Subject to any disclaimer, the term of this patent is extended or adjusted under 35 U.S.C. 154(b) by 0 days.

(21) Appl. No.: 16/845,881

(22) Filed: Apr. 10, 2020

(65) Prior Publication Data

US 2021/0106106 A1  Apr. 15, 2021

Related U.S. Application Data

(60) Provisional application No. 62/912,959, filed on Oct. 9, 2019.

(51) Int. Cl.
*H04M 1/00* (2006.01)
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/002* (2013.01)

(58) Field of Classification Search
CPC ... A45C 11/00; A45C 11/38; A45C 2011/002; H04B 1/3888
See application file for complete search history.

(56) References Cited

U.S. PATENT DOCUMENTS

| | | | |
|---|---|---|---|
| 9,985,678 B1* | 5/2018 | Sumida | H04M 1/04 |
| 2009/0230161 A1 | 9/2009 | Emsky | |
| 2010/0072334 A1 | 3/2010 | Gette et al. | |
| 2012/0025039 A1 | 2/2012 | Segal | |
| 2012/0118770 A1* | 5/2012 | Valls | F16M 13/04 |
| | | | 206/320 |
| 2013/0214019 A1 | 8/2013 | Wu | |
| 2014/0097238 A1* | 4/2014 | Ghazizadeh | G06T 7/80 |
| | | | 235/375 |
| 2015/0027912 A1 | 1/2015 | Liu | |
| 2015/0072555 A1* | 3/2015 | Riddiford | F16M 11/041 |
| | | | 439/575 |
| 2016/0344437 A1* | 11/2016 | Gordon | H04B 1/3888 |
| 2017/0164705 A1* | 6/2017 | Johnson | B29C 45/1676 |

* cited by examiner

*Primary Examiner* — Nhan T Le
(74) *Attorney, Agent, or Firm* — Boudwin Intellectual Property; Daniel Boudwin

(57) ABSTRACT

A cellular device case having a built-in mount includes a body that is made up of a back portion and a plurality of sidewalls forming an interior volume. The interior volume fits a cellular device. The case has at least one mount attached to the case. The at least one mount is slidably attached to a recess that k placed within the back portion of the body. There is further a suction cup located on an outside surface of the back portion.

9 Claims, 5 Drawing Sheets

CELLULAR DEVICE CASE HAVING A BUILT-IN MOUNT

CROSS REFERENCE TO RELATED APPLICATIONS

This application claims the benefit of U.S. Provisional Application No. 62/912,959 filed on Oct. 9, 2019. The above identified patent application is herein incorporated by reference in its entirety to provide continuity of disclosure.

BACKGROUND OF THE INVENTION

The present invention relates to a cellular case. More particularly, the present invention provides a cellular case having a built-in phone mount.

Cellular devices have advanced to the level of being a micro-computer held in the palm of your hand. These devices are now capable of playing videos or other media programs. While these devices have advanced significantly from a capability standpoint, they do not have a physical means of being held upright.

When using a cellular device, it can be difficult to hold the device with one or both hands and perform other tasks. In some instances, an individual will attempt to balance their cellular device on a table or desk. This can lead to the device falling or not staying in place. When a cellular device falls in some instances it can be extremely difficult to retrieve.

Consequently, there is a need in for an improvement in the art of cellular device cases. The present invention substantially diverges in design elements from the known art while at the same time solves a problem many people face when trying to watch a video on their phone. In this regard the present invention substantially fulfills these needs.

SUMMARY OF THE INVENTION

The present invention provides a cellular device case having a built-in mount wherein the same can be utilized for providing convenience for the user when using a cellular device case having a built-in mount. The cellular device case having a built-in mount includes a back portion having a plurality of sidewalls rising therefrom, wherein the back portion and the sidewalls are configured to fit a cellular device therein. A first recess is located through at least one of the plurality of sidewalk and into the back portion. A first attachment hook is slidably attached within the first recess.

Another object of the present invention is to have a second recess located through at least one of the plurality of sidewalk and into the back portion. Further, a second attachment hook is slidably attached within the second recess.

Another object of the present invention is to have the first attachment hook and the second attachment hook attached to different sidewalls.

Another object of the present invention is to have the back portion have at least one aperture placed therein.

Another object of the present invention is to have the aperture be positioned such that a cellular device camera is located through the aperture.

Another object of the present invention is to have a plurality of buttons attached through the plurality of sidewalls.

Another object of the present invention is to have the buttons configured to operate the buttons of the cellular device.

Another object of the present invention is to have a suction cup placed on an outer surface of the back portion.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
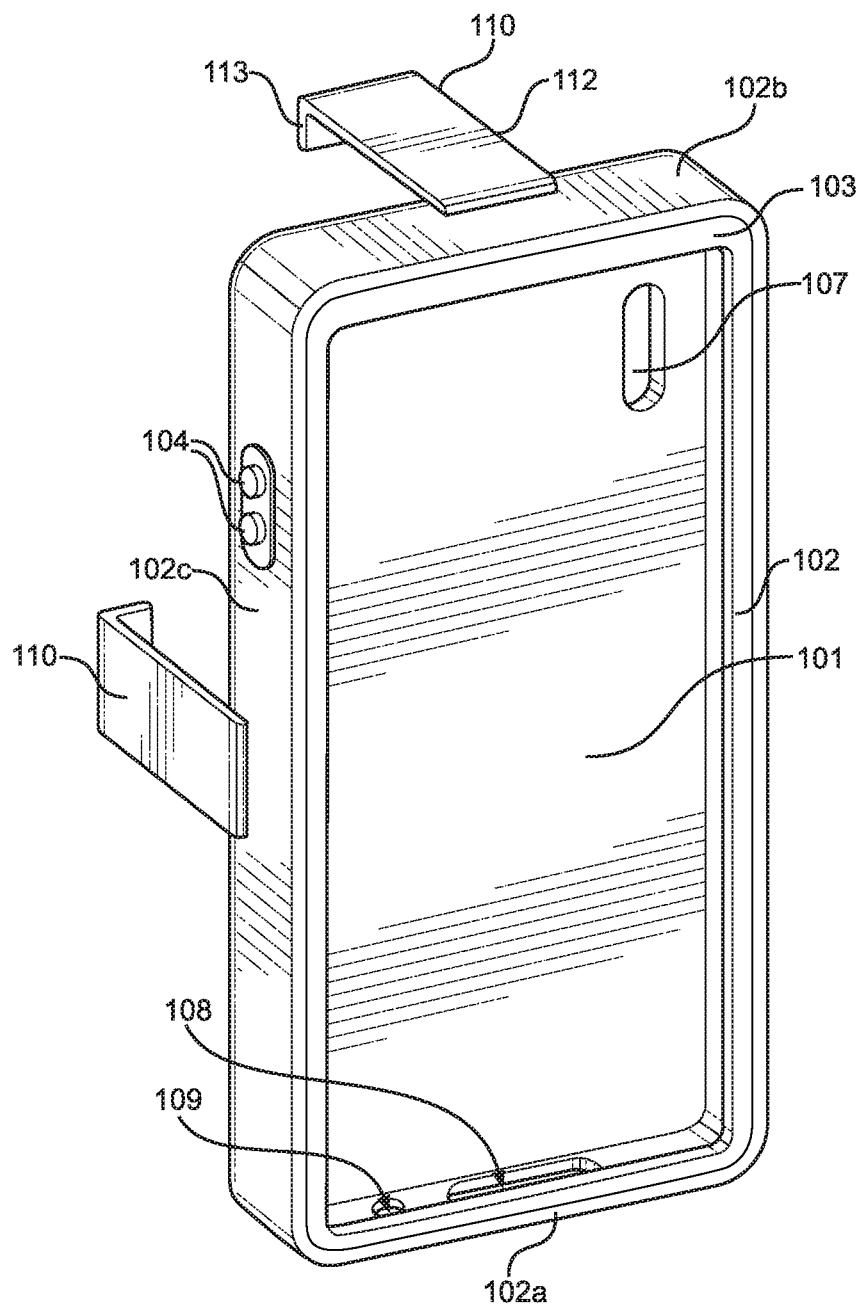
FIG. 1 shows a perspective view of an embodiment of the cellular device case having a built-in mount.

Reference is made herein to the attached drawings. Like reference numerals are used throughout the drawings to depict like or similar elements of the cellular device case having a built-in mount. For the purposes of presenting a brief and clear description of the present invention, a preferred embodiment will be discussed as used for the cellular device case having a built-in mount. The figures are intended for representative purposes only and should not be considered to be limiting in any respect.

Referring now to FIG. 1, there is shown a perspective view of an embodiment of the cellular device case having a built-in mount. The cellular device having a built-in mount is comprised of a housing having a back portion 101 and a plurality of sidewalk 102. The back portion 101 and the plurality of sidewalk 102 create an interior volume. The interior volume is configured to house a cellular device. In one embodiment the plurality of sidewalls have a lip 103 located at an upper side thereof. The lip 103 will secure a cellular device within the housing.

In one embodiment there is a protective screen that is attached to the upper end of the side walls. This protective screen will serve to protect the screen of the cellular device. In one embodiment the housing is configured to allow other protective screens to be attached directly to the cellular device. In another embodiment the protective screen will secure to the protective case after the phone is in place. In an embodiment these protective screens will allow a touch screen of the cellular device to still be operated.

The plurality of sidewalls 102 are configured to have buttons 104 placed therethrough. These buttons 104 on the plurality if sidewalls 102 are configured to operate the buttons located on the side of a cellular device. In another embodiment the buttons 104 operate the volume controls. In another embodiment there is a button placed on a sidewall that will control a cellular devices lock button.

The base 101 of the cellular device case having a built-in mount has at least one aperture 107 placed therein. In one embodiment this aperture 107 will correspond with a camera located on the back of a cellular device. In a further embodiment there is an aperture 108 located on a bottom sidewall 102a. This aperture 108 will correspond with a cellular device charging port. In yet another embodiment there is another aperture 109 located on the bottom sidewall 102a. This aperture 109 will correspond with a headphone jack of the cellular device.

The cellular device case having a built-in mount has at least one mounting bracket attached thereto. In one embodiment there is a mounting bracket 110 protruding from the top sidewall 102b. In one embodiment there is a mounting bracket 111 protruding from a side sidewall 102c. Each mounting bracket 110, 111 has a top portion 112 and a front portion 113. The top portion 112 is attached to the device case. The top portion 112 is located roughly perpendicular to and behind the front portion 113. The front portion 113 is attached toward the back portion 101 of the device case. This will prevent the case from slipping from a mounting point.

Figure 2:
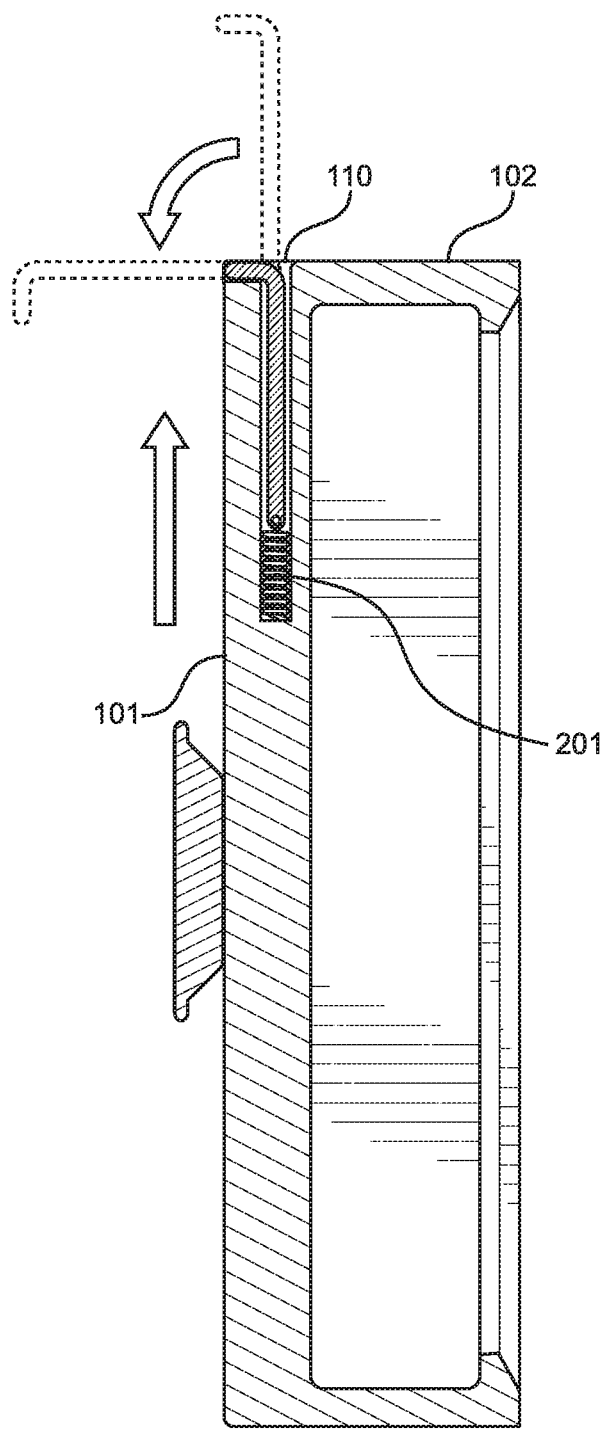
FIG. 2 shows a cross-sectional view of an embodiment of the cellular device case having a built-in mount.
Figure 6:
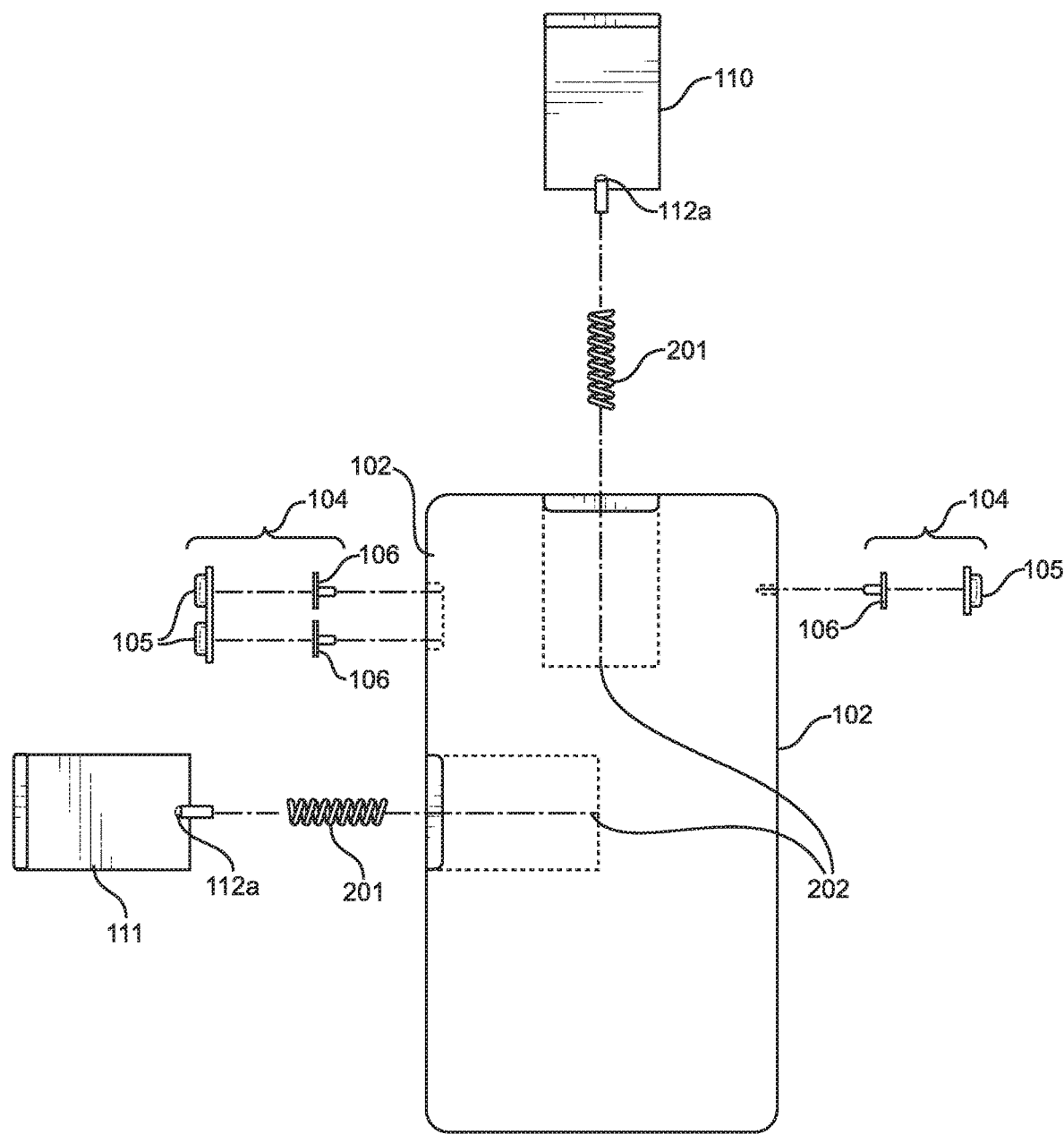
FIG. 6 shows an exploded view of an embodiment of the cellular device case having a built-in mount.

Referring now to FIG. 2 and FIG. 6, there is shown an exploded and a cross-sectional view of an embodiment of the cellular device case having a built-in mount. In one embodiment each mounting bracket 110, ill is configured to be withdrawn through the sidewalk 102 into the back portion 101. In this embodiment the back portion 101 will have an interior volume. The interior volume is configured to house each mounting bracket 110, 111. In one embodiment the mounting brackets 110, 111 are configured to be spring biased into the back portion 101 of the device case. In this embodiment the top portion 112 of each mounting bracket 110, 111 has an aperture 112a located through the end opposite the front portion 113. A spring 201 is attached to the aperture 112a at one end. There is a spring attachment point 202 located within the interior volume of the back portion 101. This will spring bias the mounting brackets 110, 111 within the back portion 101.

In one embodiment the buttons 104 are comprised of a flexible portion 105 and a solid portion 106. These portions 105, 106 will be connected together and inserted into the sidewalk 102 such that the flexible portion 105 may be depressed and the solid portion 106 will contact a button on the cellular device activating it.

Figure 3:
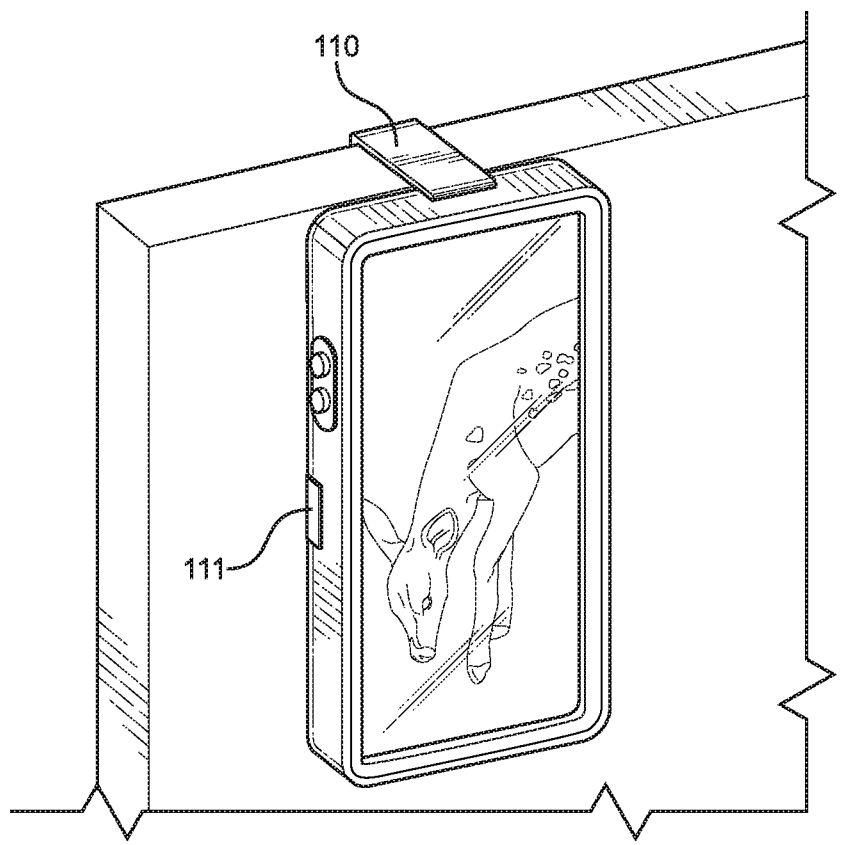
FIG. 3 shows a perspective view of an embodiment of cellular device being mounted with the cellular device case having a built-in mount.

Referring now to FIG. 3, there is shown a perspective view of an embodiment of cellular device being mounted with the cellular device case having a built-in mount. In one embodiment the cellular device case having a built-in mount is mounted using the mounting bracket 110, 111 located on a single side. In this embodiment either mounting bracket 110, 111 may be used to secure the device to a mounting location. This will allow the cellular device to be mounted in either portrait or landscape orientation.

Figure 4:
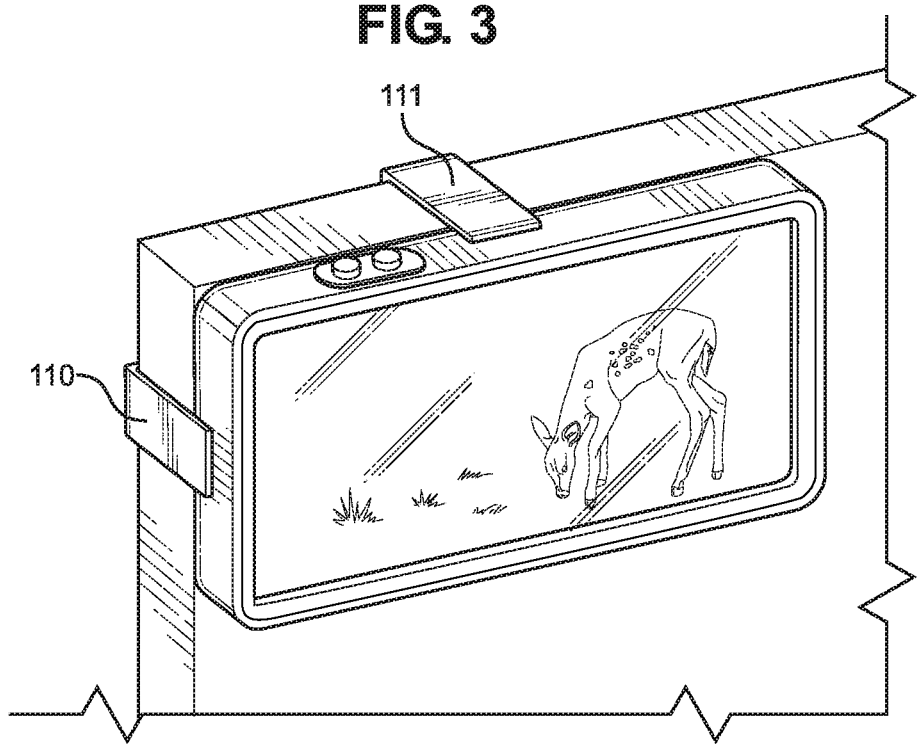
FIG. 4 shows a perspective view of an embodiment of cellular device being mounted with the cellular device case having a built-in mount.

Referring now to FIG. 4, there is shown a perspective view of an embodiment of cellular device being mounted with the cellular device case having a built-in mount. In one embodiment the cellular device case having a built-in mount is mounted using both mounting brackets 110, 111. In this embodiment one mounting bracket 110, 111 is used to attach to the top of a mounting location. The second mounting bracket 110, 111 is attached to the side of a mounting location. This will prevent the mobile device from sliding across a mounting location.

Figure 5:
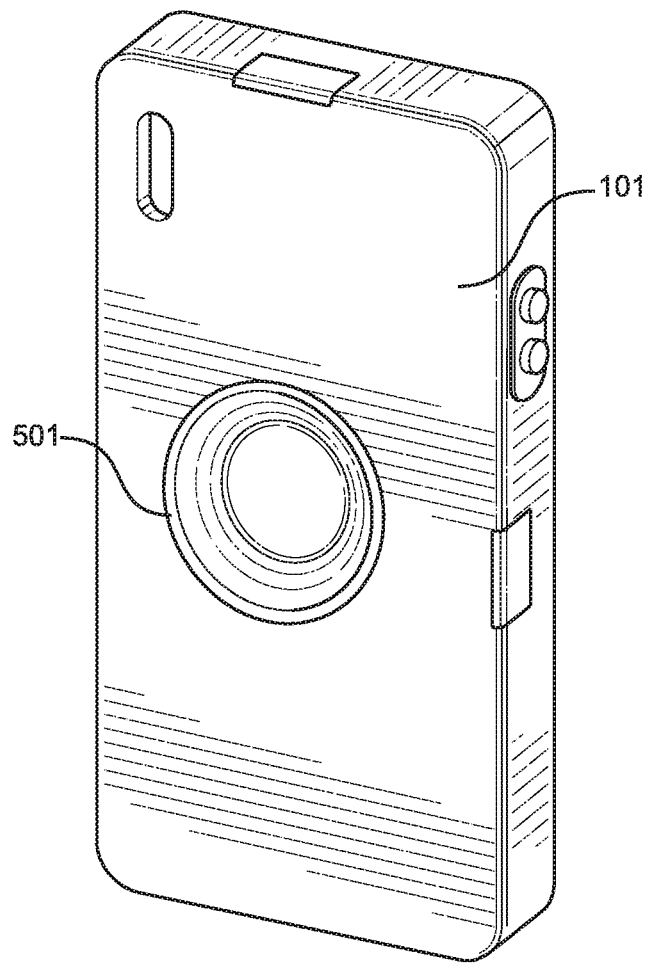
FIG. 5 shows a rear view of an embodiment of the cellular device case having a built-in mount.

Referring now to FIG. 5, there is shown a rear view of an embodiment of the cellular device case having a built-in mount. In one embodiment the back portion 101 has a suction cup 501 located on a back side thereof. In one of these embodiments the back portion 101 will still house the mounting brackets. In one embodiment the suction cup 501 is receded into a cavity of the back portion 101. In a further embodiment the suction cup 501 is configured to be expanded from the cavity and receded back into the cavity. In this embodiment the suction cup 501 functions similar to a pop-socket. In one embodiment the mounting brackets are not needed and the suction cup 501 will mount the device case.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cellular device case having a built-in mount, the device case comprising:
    a back portion having a plurality of sidewalls rising therefrom, wherein the back portion and the sidewalls are configured to fit a cellular device therein;
    a first mounting bracket is attached to a top sidewall of the plurality of sidewalls;
    wherein the first mounting bracket consists of a top portion and a front portion;
    the top portion attached to the top sidewall;
    the front portion attached to the top portion, parallel to the back portion and perpendicular to the top portion.

2. The cellular device case having a built-in mount of claim 1, further comprising a second mounting bracket attached to a side sidewall of the plurality of sidewalls adjacent to the top sidewall, wherein the second mounting bracket consists of a second top portion and a second front portion, the second top portion attached to the side sidewall, and the second front portion attached to the second top portion, parallel to the back portion and perpendicular to the second top portion.

3. The cellular device case having a built-in mount of claim 2, wherein the first mounting bracket is attached to a top sidewall and the second mounting bracket is attached to a side sidewall.

4. The cellular device case having a built-in mount of claim 1, wherein the back portion has at least one aperture placed therein.

5. The cellular device case having a built-in mount of claim 4, wherein the aperture is positioned such that a cellular device camera is located through the aperture.

6. The cellular device case having a built-in mount of claim 1, further comprising a plurality of buttons attached through the plurality of sidewalls.

7. The cellular device case having a built-in mount of claim 6, wherein the buttons are configured to operate the buttons of the cellular device.

8. The cellular device case having a built-in mount of claim 1, further comprising a suction cup centrally disposed on an outer surface of the back portion, wherein the suction cup is receded into a cavity of the back portion.

9. A cellular device case having a built-in mount, the device case comprising:
- a back portion having a plurality of sidewalls rising therefrom, wherein the back portion and the sidewalls are configured to fit a cellular device therein;
- a first mounting bracket is attached to a top sidewall of the plurality of sidewalls;
- wherein the first mounting bracket consists of a top portion and a front portion;
- the top portion attached to the top sidewall;
- the front portion attached to the top portion, parallel to the back portion and perpendicular to the top portion;
- a second mounting bracket attached to a side sidewall of the plurality of sidewalls, adjacent to the top sidewall, wherein the second mounting bracket consists of a second top portion and a second front portion;
- the second top portion attached to the side sidewall;
- the second front portion attached to the second top portion, parallel to the back portion and perpendicular to the second top portion;
- a suction cup placed on an outer surface of the back portion.

* * * * *